Patented Dec. 9, 1930

1,784,360

UNITED STATES PATENT OFFICE

CHARLES F. KAEGEBEHN, OF HOBOKEN, NEW JERSEY, ASSIGNOR TO R. T. VANDERBILT CO., INC., OF NEW YORK, N. Y., A CORPORATION OF NEW YORK

FATTY-OIL COMPOSITION

No Drawing.  Application filed January 31, 1929. Serial No. 336,657.

This invention relates to improvements in the stabilization of fatty acid glycerides such as tripalmitin, triolein and tristearin, and glycerides of similar fatty acids, and also glycerides comprising mixtures of these fatty acids and similar fatty acids, to prevent their oxidation and decomposition under the influence of light and heat, etc.

According to the present invention, there is incorporated with the glyceride a small amount of a stabilizing material which imparts thereto increased stability and resistance to oxidation and decomposition. The stabilizing agents which are added according to the present invention are aryl phenols, such as the oxy-diphenyls, and more particularly 2-oxy-diphenyl and 4-oxy-diphenyl or mixtures of these compounds may be employed.

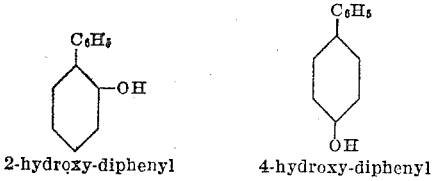

2-hydroxy-diphenyl    4-hydroxy-diphenyl

The stabilizing ingredient or ingredients employed may be added to the glycerides directly or they first may be dissolved in a suitable solvent such as alcohol or benzol and be added to the material to be stabilized in this form. The solvent may later be volatilized and removed from the material where desired.

A small amount of the stabilizing material has been found to give satisfactory results. In general, a fraction of a percent, such as three-tenths to five-tenths of a percent will suffice.

The following examples will further illustrate the invention:

A commercial fat comprising glycerides of stearic acid and palmitic acid, and possibly other fatty acids of the same order, and which may also contain a small amount of free fatty acids, may be stabilized by adding .4% of 2-oxy-diphenyl thereto. The stabilizer is advantageously added from a solution of the stabilizer in alcohol or benzol and the solvent may thereafter be removed from the fat by steam-distillation or by otherwise heating the mixture to volatilize the solvent employed.

As a further example, triolein may be stabilized by the addition of about .3 to .5% of 4-oxy-diphenyl thereto. The stabilizer may be incorporated in the glycerides by first dissolving it in a solvent or the stabilizer may be added directly to the triolein and incorporated therein by stirring.

I claim:

1. A stabilized fatty acid glyceride which comprises a small amount of a phenol having a nuclear H atom substituted by an aryl group.

2. A stabilized fatty acid glyceride comprising a small amount of an oxy-diphenyl.

3. A stabilized fatty acid glyceride comprising a small amount of 4-oxy-diphenyl.

4. Triolein admixed with a small amount of a phenol having a nuclear H atom substituted by an aryl group.

5. Tripalmitin admixed with a small amount of a phenyl having a nuclear H atom substituted by an aryl group.

6. Tristearin admixed with a small amount of a phenol having a nuclear H atom substituted by an aryl group.

7. A stabilized fatty acid glyceride comprising a small amount of 2-oxy-diphenyl.

In testimony whereof I affix my signature.

CHARLES F. KAEGEBEHN.